United States Patent
Araya

(10) Patent No.: US 10,425,592 B2
(45) Date of Patent: Sep. 24, 2019

(54) DETECTION DEVICE AND MICROSCOPE SYSTEM

(71) Applicant: OLYMPUS CORPORATION, Hachioji-shi, Tokyo (JP)

(72) Inventor: Akinori Araya, Kanagawa (JP)

(73) Assignee: OLYMPUS CORPORATION, Tokyo (JP)

( * ) Notice: Subject to any disclaimer, the term of this patent is extended or adjusted under 35 U.S.C. 154(b) by 10 days.

(21) Appl. No.: 15/793,535

(22) Filed: Oct. 25, 2017

(65) Prior Publication Data

US 2018/0167561 A1 Jun. 14, 2018

(30) Foreign Application Priority Data

Dec. 9, 2016 (JP) ................................. 2016-239120

(51) Int. Cl.
*H04N 5/243* (2006.01)
*G01J 1/44* (2006.01)
(Continued)

(52) U.S. Cl.
CPC ................ *H04N 5/243* (2013.01); *G01J 1/44* (2013.01); *G02B 21/008* (2013.01);
(Continued)

(58) Field of Classification Search
CPC ................. G02B 21/008; G02B 21/365; G01J 2001/4406; H04N 5/243; H04N 5/2352; H04N 5/35509; H04N 5/378
See application file for complete search history.

(56) References Cited

U.S. PATENT DOCUMENTS

| 5,068,718 A * | 11/1991 | Iwabe | H04N 5/20 348/645 |
| 2010/0301192 A1 | 12/2010 | Wang | |
| 2011/0103679 A1* | 5/2011 | Campbell | G01B 11/0608 382/152 |

FOREIGN PATENT DOCUMENTS

| DE | 102015102631 A1 | 8/2016 |
| DE | 102015102632 A1 | 8/2016 |

(Continued)

OTHER PUBLICATIONS

Extended European Search Report (EESR) dated May 4, 2018 issued in counterpart European Application No. 17198295.2.
(Continued)

*Primary Examiner* — Huy T Nguyen
(74) *Attorney, Agent, or Firm* — Holtz, Holtz & Volek PC

(57) ABSTRACT

Observation in which the properties of a detection element are utilized is performed. Provided is a detection device including: a detector that has a linear response characteristic, in which an output signal changes linearly, and a nonlinear response characteristic, in which the output signal changes nonlinearly, and that detects light from a sample and outputs the output signal in accordance with the intensity of the light; a light detection circuit that is capable of switching between a first amplification factor and a second amplification factor, the light detection circuit amplifying the output signal output from the detector based on the first amplification factor or the second amplification factor so as to generate a brightness signal; and an input unit with which a user is allowed to switch the amplification factor for the output signal to be used between the first amplification factor and the second amplification factor.

4 Claims, 4 Drawing Sheets

(51) Int. Cl.
G02B 21/00 (2006.01)
G02B 21/36 (2006.01)
H04N 5/355 (2011.01)
H04N 5/235 (2006.01)
H04N 5/378 (2011.01)

(52) U.S. Cl.
CPC ......... *G02B 21/365* (2013.01); *H04N 5/2352* (2013.01); *H04N 5/35509* (2013.01); *H04N 5/378* (2013.01); *G01J 2001/4406* (2013.01)

(56) References Cited

FOREIGN PATENT DOCUMENTS

JP 09236750 A 9/1997
JP 2007041120 A 2/2007

OTHER PUBLICATIONS

Anonymous, "Leica HyD for Confocal Imaging Hybrid detection technology for high fidelity", Nov. 25, 2011, XP055469029, Retrieved from Internet: <https://www.leica-microsystems.com/fileadmin/downloads/Leica%20TCS%20SP5%2011/Brochures/Leica_HyD-Brochure_EN.pdf>.

Anonymous, "Matching ADC via camera Gain to Linear Range of CCD sensor", Dec. 20, 2011, XP055469026, Retrieved from Internet: <https://www.roperscientitic.de/fwellcapacity.html>.

Anonymous, "Si APD, MPPC", Aug. 28, 2014, XP055469058, Retrieved from Internet: <http://www.hamamatsu.com/resources/pdf/ssd/e03handbook_si_apd_mppc.pdf>.

Anonymous, "Zeiss 710 Confocal Microscope User Guide", Aug. 6, 2014, XP055469110, Retrieved from internet: <http://www.biotech.cornell.edu/sites/default/files/uploads/ImagingDocs/Zeiss%20710%20User%20Guide%208-6-14.pdf>.

Garutti, "Silicon photomultipliers for high energy physics detectors", Journal of Instrumentation, Institute of Physics Publishing; vol. 6, No. 10; Bristol, GB; Oct. 18, 2011, p. C10003, XP020212579.

Otte, "The Silicon Photomultiplier—A new device for High Energy Physics, Astroparticle Physics, Industrial and Medical Applications", SNIC Symposium, Stanford, California—Apr. 3-6, 2006; Apr. 6, 2006, XP055469106, Retrieved from internet: <http://citeseerx.ist.psu.edu/viewdoc/download?doi=10.1.1.534.6156&rep=rep1&type=pdf>.

European Office Action dated Apr. 30, 2019 issued in counterpart European Application No. 17198295.2.

Texas Instruments: "Sensor to ACD-analog interface design", Retrieved from the Internet: URL:http://www.ti.com/lit/an/slyt173/slyt173.pdf, May 15, 2000.

Anonymous, "CCD Encyclopedia", Retrieved from the Internet: URL:https://web.archive.org/web/20150811022827/https://www.roperscientific.de/detectionmodes.html, Aug. 11, 2015.

* cited by examiner

DETECTION DEVICE AND MICROSCOPE SYSTEM

CROSS-REFERENCE TO RELATED APPLICATIONS

This application is based on Japanese Patent Application No. 2016-239120, the contents of which are incorporated herein by reference.

TECHNICAL FIELD

The present invention relates to detection devices and microscope systems.

BACKGROUND ART

A known microscope device in the related art changes the gain of a detection element that detects light from a sample (for example, see Patent Literature 1 and Patent Literature 2). The microscope device according to Patent Literature 1 acquires images by changing the gain of a detector, and cuts and pastes an image acquired at a low gain and an image acquired at a high gain based on a certain threshold value so as to generate an image with an overall high signal-to-noise ratio. The microscope device according to Patent Literature 2 changes the offset, gain, and high voltage (HV) so as to measure the dynamic range of an output signal from a detection element, thereby automatically setting an optimal observation parameter.

CITATION LIST

Patent Literature

{PTL 1}
Japanese Unexamined Patent Application, Publication No. 2007-041120
{PTL 2}
Japanese Unexamined Patent Application, Publication No. Hei 09-236750

SUMMARY OF INVENTION

A first aspect of the present invention provides a detection device including: a detection element that has a linear response characteristic, in which an output signal changes linearly with respect to an input light intensity smaller than or equal to a predetermined value, and a nonlinear response characteristic, in which the output signal changes nonlinearly with respect to an input light intensity larger than the predetermined value, and that detects light from a sample and outputs the output signal in accordance with the intensity of the light; a detection circuit that is capable of switching between a first amplification factor based on which the output signal within a linear response characteristic range falls within a predetermined brightness-signal taking range and a second amplification factor that is lower than the first amplification factor and based on which the output signal including a nonlinear response characteristic range falls within the predetermined brightness-signal taking range, the detection circuit amplifying the output signal output from the detection element so as to generate a brightness signal; and an input unit with which an operator is allowed to switch the amplification factor for the output signal to be used by the detection circuit between the first amplification factor and the second amplification factor.

A second aspect of the present invention provides a microscope system including: an objective lens that focuses light from a sample; the aforementioned detection device that detects the light focused by the objective lens so as to generate the brightness signal; and an image forming unit that forms an image based on the brightness signal generated by the detection circuit.

DESCRIPTION OF EMBODIMENTS

A detection device and a microscope system according to an embodiment of the present invention will be described below with reference to the drawings.

Figure 1:
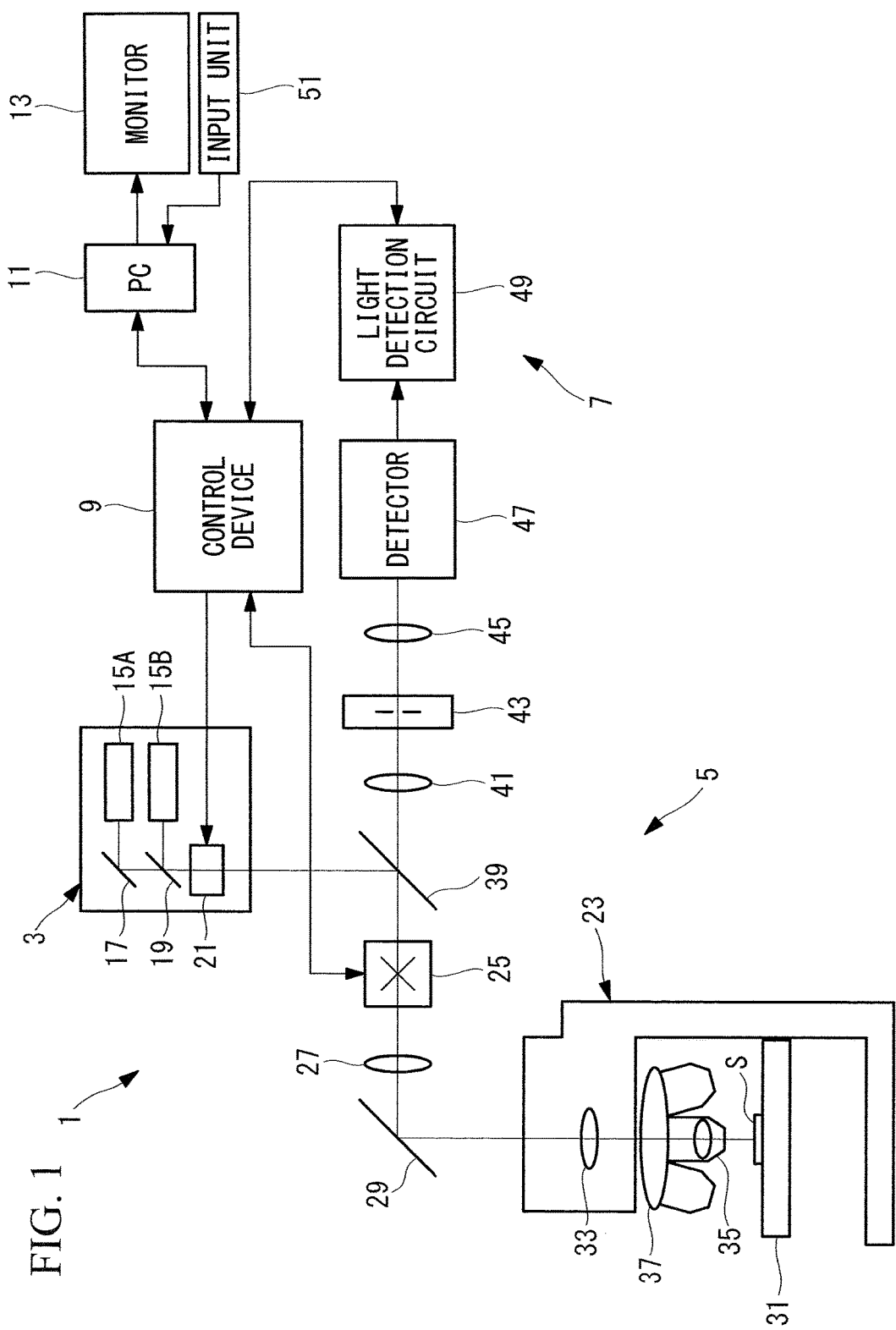
FIG. 1 schematically illustrates the configuration of a microscope system according to an embodiment of the present invention.

As shown in FIG. 1, a microscope system 1 according to this embodiment includes: a light source unit 3 that generates laser light; a microscope device 5; a detection device 7 that detects fluorescence from a sample S; a control device 9 that controls the microscope device 5, the light source unit 3, and the detection device 7; a personal computer (PC, image forming unit) 11 that forms an image; and a monitor 13 that displays, for example, an image and a graphical user interface (GUI).

The light source unit 3 is, for example, a multiple-wavelength laser light source. The light source unit 3 includes lasers 15A and 15B, such as supercontinuum lasers that generate laser light, a reflecting mirror 17 that reflects the laser light emitted from the laser 15A, a dichroic mirror 19, and a light-level adjusting unit 21, such as an acousto-optic element. The dichroic mirror 19 transmits the laser light reflected by the reflecting mirror 17, reflects the laser light emitted from the laser 15B, and combines the optical paths of these beams of laser light. The light-level adjusting unit 21 adjusts the light level of the laser light whose optical path has been combined by the dichroic mirror 19.

The light source unit 3 causes the lasers 15A and 15B to generate beams of laser light and causes the light-level adjusting unit 21 to control wavelength selection and intensity adjustment of these beams of laser light, so that laser light in a predetermined wavelength band and with a predetermined intensity can be emitted.

The microscope device 5 includes a microscope body 23 having a stage 31 on which the sample S is placed, a scanner 25 that scans the laser light from the light source unit 3, a pupil projection lens 27 that focuses the laser light scanned by the scanner 25, and a reflecting mirror 29 that reflects the laser light focused by the pupil projection lens 27 toward the microscope body 23.

The scanner 25 may be, for example, a galvanometer mirror, a resonant scanner, or an acousto-optic deflector (AOD).

In addition to the stage 31 mentioned above, the microscope body 23 includes an imaging lens 33 that converts the laser light reflected by the reflecting mirror 29 into collimated light, an objective lens 35, and a revolver 37. The objective lens 35 radiates the laser light converted into collimated light by the imaging lens 33 onto the sample S on the stage 31, and focuses fluorescence generated in the sample S. The revolver 37 supports a plurality of objective lenses 35 having different magnifying powers in a switchable manner.

The microscope device 5 includes a dichroic mirror 39 that splits the fluorescence, collected by the objective lens 35 and returning along the optical path of the laser light, from the optical path of the laser light, a focusing lens 41 that focuses the fluorescence split from the optical path of the laser light by the dichroic mirror 39, a pinhole 43 through which, of the fluorescence focused by the focusing lens 41, only fluorescence generated at a focal position of the objective lens 35 in the sample S is allowed to pass, and a collimating lens 45 that converts the fluorescence passing through the pinhole 43 into collimated light and causes the collimated light to enter the detection device 7.

The detection device 7 includes a detector (detection element) 47 that detects the fluorescence converted into collimated light by the collimating lens 45 and outputs an output signal in accordance with the light intensity thereof, a light detection circuit (detection circuit) 49 that processes the output signal output from the detector 47, and an input unit 51 with which a user (operator) is allowed to input a command to be sent to the light detection circuit 49.

Figure 2:
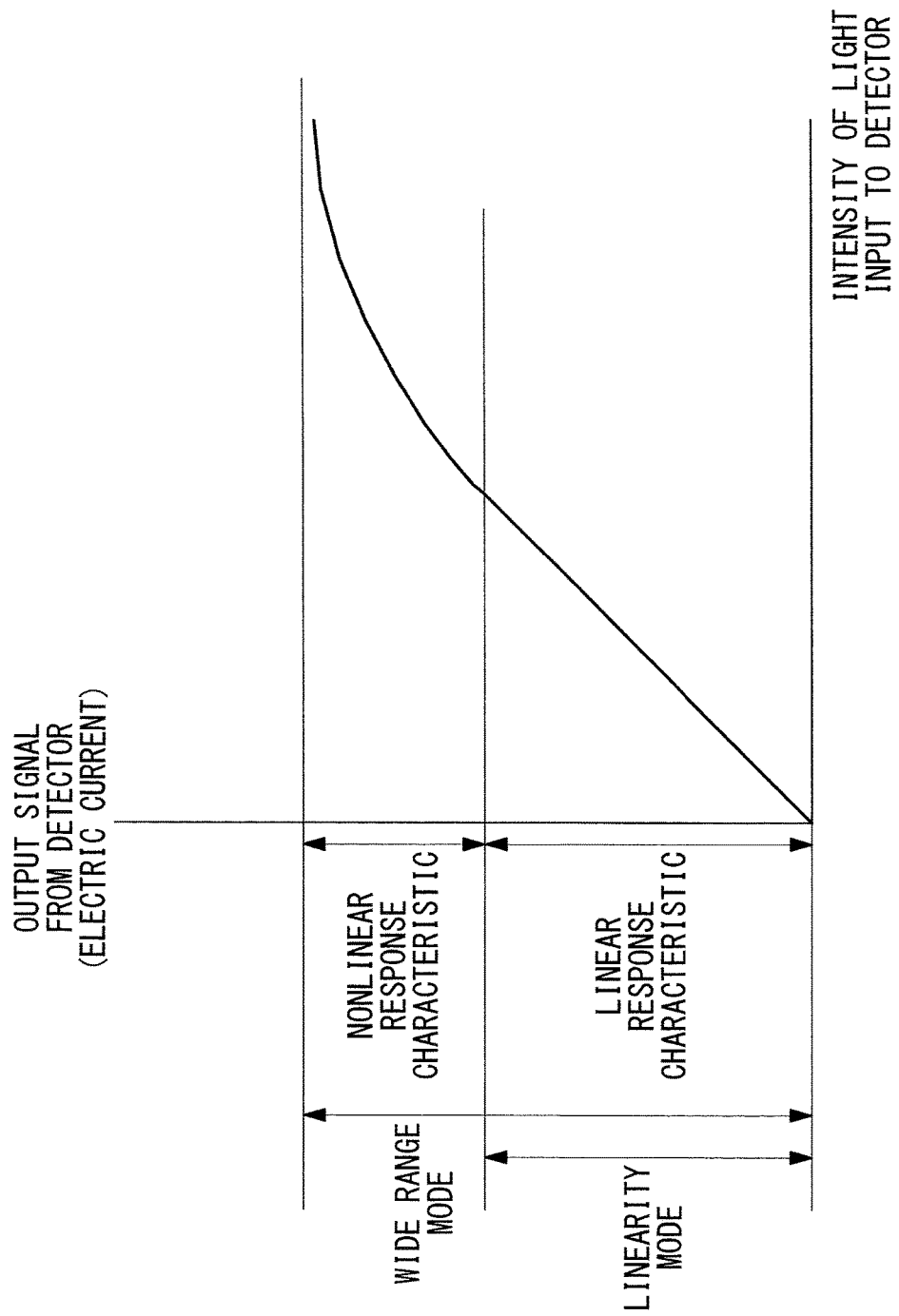
FIG. 2 is a graph illustrating an example of response characteristics of an output signal of a detection element in FIG. 1.

The detector 47 may be, for example, a photoelectric conversion element, such as a silicon photomultiplier (SIPM). As shown in FIG. 2, the detector 47 has a linear response characteristic in which the output signal changes linearly with respect to an input light intensity smaller than or equal to a predetermined value, and has a nonlinear response characteristic in which the output signal changes nonlinearly with respect to an input light intensity larger than the predetermined value.

Figure 3:
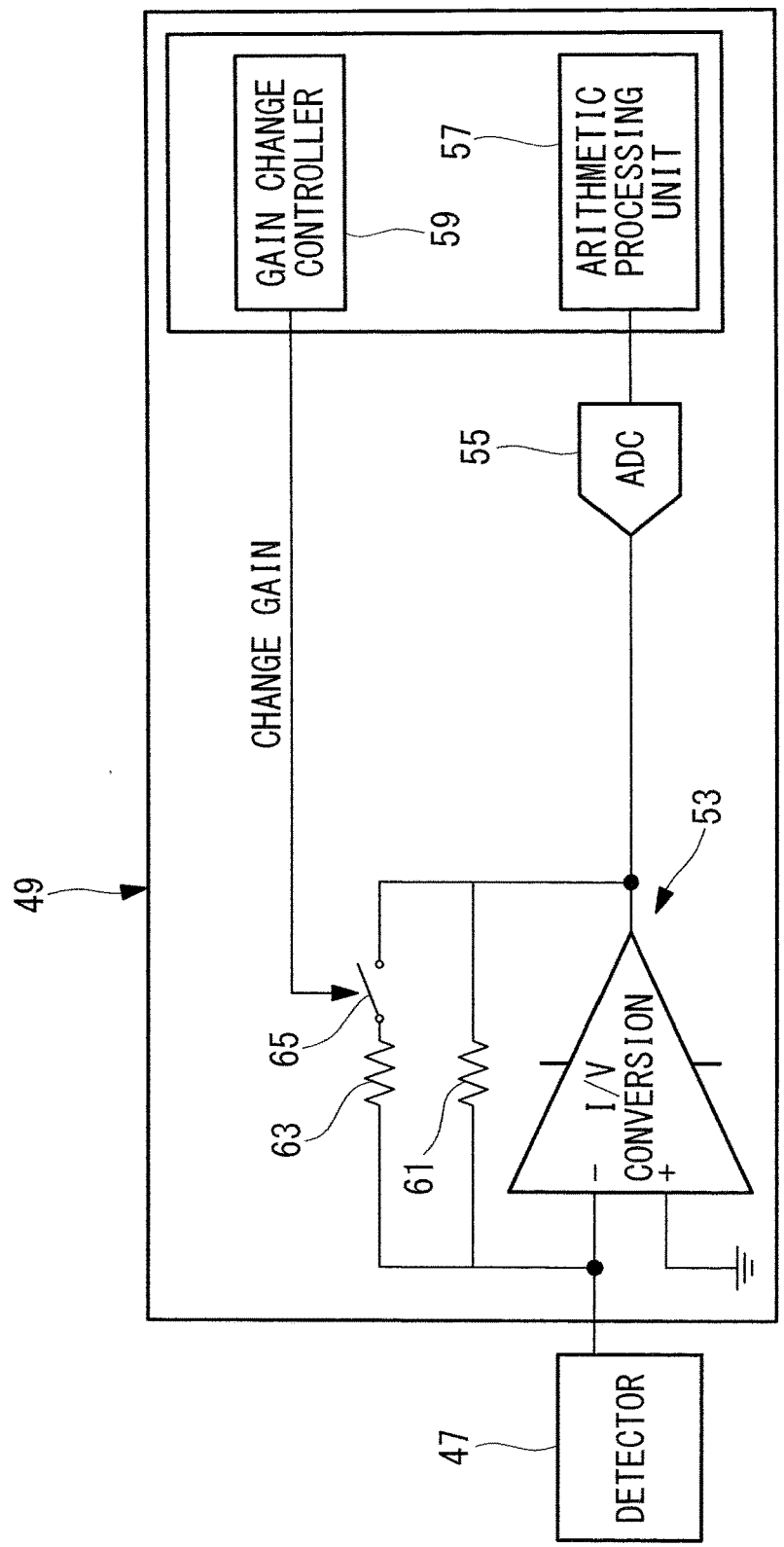
FIG. 3 schematically illustrates the configuration of a detection circuit in FIG. 1.

For example, as shown in FIG. 3, the light detection circuit 49 includes an amplifier 53 that converts the output signal output from the detector 47 into voltage from electric current, an analog-to-digital converter (ADC) 55 that performs analog-to-digital conversion on the output signal converted into voltage by the amplifier 53, an arithmetic processing unit 57 that processes the output signal output from the ADC 55 into a pixel brightness signal, and a gain change controller 59 that changes and controls the amplification factor of the output signal to be converted into voltage from electric current by the amplifier 53.

The amplifier 53 includes an inverting input terminal (−), a noninverting input terminal (+), and an output terminal. Resistors 61 and 63 are connected in parallel between the inverting input terminal (−) and the output terminal of the amplifier 53. The noninverting input terminal (+) is connected to ground. Moreover, the amplifier 53 is provided with a switch 65 for switching between a resistance mode and a nonresistance mode by means of the resistor 63.

The amplifier 53 is capable of switching between a first amplification factor with a high gain setting based on which an output signal in the linear response characteristic range of the detector 47 shown in FIG. 2 falls within a predetermined brightness-signal taking range and a second amplification factor with a gain setting, that is, a lower gain setting than the first amplification factor, based on which an output signal including the nonlinear response characteristic range of the detector 47 shown in FIG. 2 falls within the predetermined brightness-signal taking range. The predetermined brightness-signal taking range corresponds to, for example, an input range (e.g., 12 bits) of the ADC 55.

In accordance with the user's command sent from the input unit 51, the first amplification factor with the high gain setting is set in the amplifier 53 when the switch 65 is turned off (opened), whereas the second amplification factor with the low gain setting is set in the amplifier 53 when the switch 65 is turned on (closed).

The input unit 51 is constituted of an input device, such as a mouse and/or a keyboard, and is capable of receiving various types of setting information in accordance with the GUI displayed on the monitor 13. The GUI displayed on the monitor 13 displays a mode switching function for switching between a "linearity priority mode", in which the first amplification factor is set such that the output signal within the linear response characteristic range of the detector 47 shown in FIG. 2 falls within the input range (12 bits) of the ADC 55, and a "dynamic-range priority mode", in which the second amplification factor is set such that the output signal including the nonlinear response characteristic range of the detector 47 shown in FIG. 2 falls within the input range (12 bits) of the ADC 55. The user may use the input unit 51 to switch between the "linearity priority mode" and the "dynamic-range priority mode".

When the user uses the input unit 51 to select one of the modes by means of the mode switching function on the GUI, the gain change controller 59 switches between the on and off modes of the switch 65 of the amplifier 53 in accordance with mode selection information sent via the control device 9.

The arithmetic processing unit 57 converts the output signal sent from the ADC 55 into brightness information for each pixel corresponding to the scan position of the scanner 25.

The control device 9 controls the light-level adjustment of the laser light performed by the light-level adjusting unit 21 of the light source unit 3 and also controls the scanning of the laser light performed by the scanner 25.

The PC 11 integrates the brightness information sent from the arithmetic processing unit 57 via the control device 9 for each pixel so as to generate an image of the sample S.

The operation of the detection device 7 and the microscope system 1 having the above-described configuration will now be described.

In order to observe the sample S by using the microscope system 1 according to this embodiment, the sample S is first placed on the stage 31, and the laser 15A or the laser 15B of the light source unit 3 is caused to generate laser light. The light level of the laser light is then adjusted by the light-level adjusting unit 21, and the laser light is output therefrom. In addition, the user uses the input unit 51 to select the "linearity priority mode" or the "dynamic-range priority mode" by means of the mode switching function on the GUI displayed on the monitor 13.

The laser light output from the light source unit 3 is reflected by the dichroic mirror 39 and is scanned by the scanner 25. Subsequently, the laser light is focused by the pupil projection lens 27, is reflected by the reflecting mirror 29, is converted into collimated light by the imaging lens 33, and is radiated onto the sample S by the objective lens 35.

Fluorescence generated in the sample S as a result of being irradiated with the laser light is collected by the objective lens 35, travels back along the optical path of the laser light via the imaging lens 33, the reflecting mirror 29, the pupil projection lens 27, and the scanner 25, is transmitted through the dichroic mirror 39, and is split from the optical path of the laser light.

The fluorescence split from the optical path of the laser light by the dichroic mirror 39 is focused by the focusing lens 41 and is partially transmitted through the pinhole 43. The fluorescence is then converted into collimated light by the collimating lens 45 and is detected by the detector 47.

When the fluorescence is detected by the detector 47, an output signal with a magnitude according to the intensity of detected fluorescence is output from the detector 47. The amplifier 53 then converts the output signal from electric current into voltage. Moreover, in accordance with the selection information about the mode selected by the user, which is sent from the input unit 51 via the control device 9, the gain change controller 59 switches between on and off modes of the switch 65 of the amplifier 53, so that the output signal is amplified based on the first amplification factor with the high gain setting or the second amplification factor with the low gain setting.

The output signal amplified by the amplifier 53 undergoes analog-to-digital conversion performed by the ADC 55, is subsequently processed into a pixel brightness signal by the arithmetic processing unit 57, and is then input to the PC 11 via the control device 9. Then, the PC 11 integrates the brightness information for each pixel so as to generate an image of the sample S. The image is then displayed on the monitor 13.

If the output signal output from the detector 47 is within the linear response characteristic range, high-resolution information of the sample S is obtained, although the brightness is low. In contrast, if the output signal output from the detector 47 includes the nonlinear response characteristic range, bright information of the sample S is obtained, although the resolution is insufficient.

In this case, by amplifying the output signal in the linear response characteristic range of the detector 47 based on the first amplification factor in accordance with the linearity priority mode so as to generate a brightness signal within the predetermined brightness-signal taking range, observation in which the brightness signal has quantitative characteristics can be performed. In contrast, by amplifying the output signal including the nonlinear response characteristic range of the detector 47 based on the second amplification factor, which is lower than the first amplification factor, in accordance with the dynamic-range priority mode so as to generate a brightness signal within the predetermined brightness-signal taking range, wide-dynamic-range observation can be performed without causing saturation of the brightness signal to occur.

Therefore, in the detection device 7 and the microscope system 1 according to this embodiment, the user uses the input unit 51 to appropriately change the amplification factor of the light detection circuit 49 to the first amplification factor or the second amplification factor in accordance with the response characteristic of the output signal output from the detector 47, so that observation in which the properties of the detector 47 are utilized to the maximum can be performed in accordance with the intended purpose of the observation.

Figure 4:
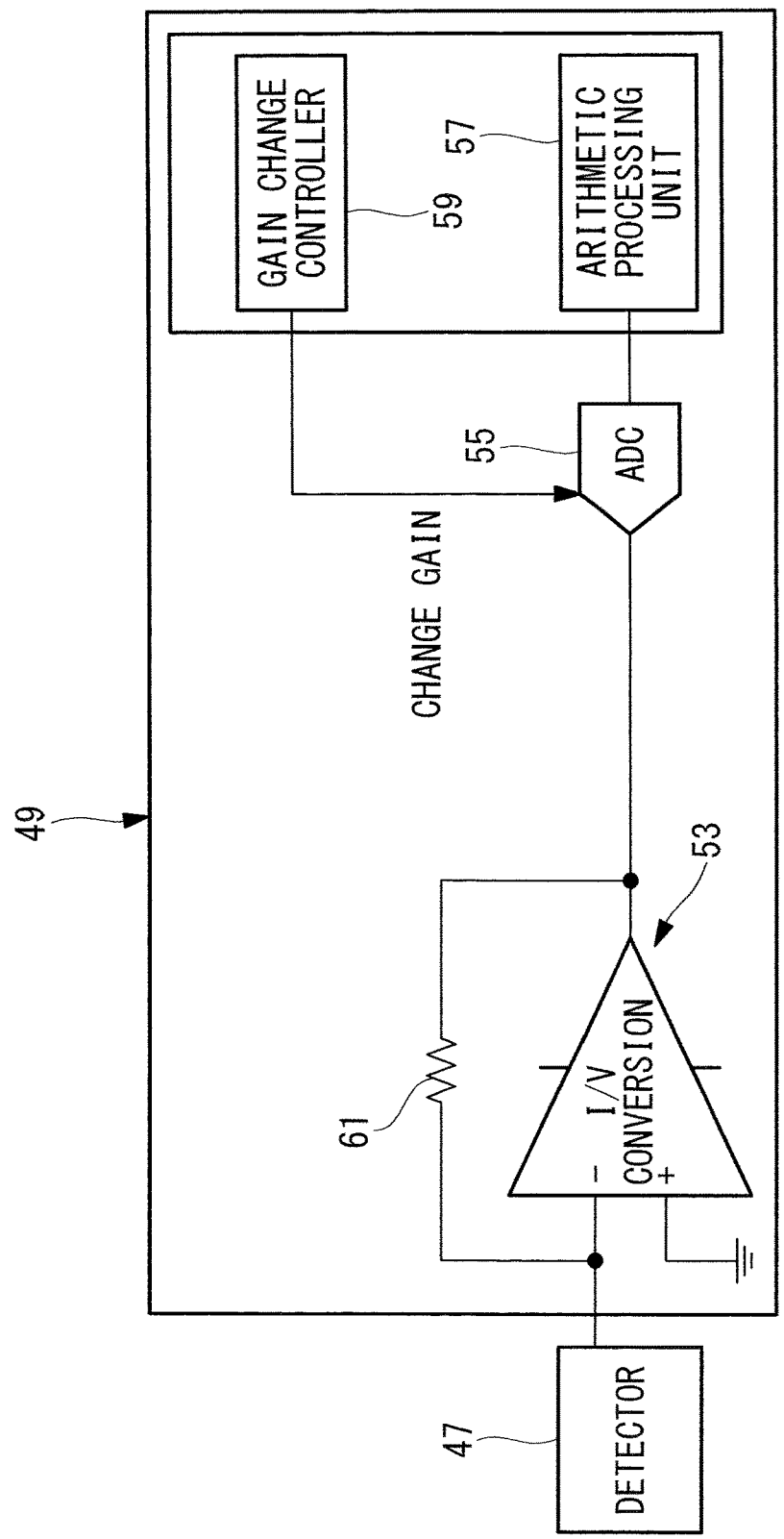
FIG. 4 schematically illustrates the configuration of a detection circuit according to a modification of the embodiment of the present invention.

As an alternative to this embodiment in which the amplification factor is changed in the amplifier 53, for example, the ADC 55 may have the gain changing function, as shown in FIG. 4, and the gain change controller 59 may control the gain changing mechanism of the ADC 55 in accordance with the selection information about the mode selected by the user by means of the mode switching function in the GUI of the input unit 51, so as to change the amplification factor for the output signal. In this case, the amplifier 53 does not need to be equipped with the resistor 63 and the switch 65, so that a simple configuration can be achieved.

This embodiment may be modified as follows.

For example, in a first modification, an interpolator (not shown) may be provided such that the interpolator performs linear interpolation by multiplying an inverse function of the nonlinear response characteristic by a brightness signal obtained as a result of amplifying the output signal including the nonlinear response characteristic range of the detector 47 based on the second amplification factor in the dynamic-range priority mode.

Accordingly, the quantitative characteristics can be improved with respect to a brightness signal that prioritizes the dynamic range. In this modification, for example, when the interpolator performs linear interpolation on the brightness signal, the bit length of the ADC 55 may be exceeded.

In a second modification, for example, the GUI may have a ratio mode, which is an observation setting mode, in which a so-called ratio imaging method for observing the activity of the sample S, which is a living sample, in real time is executed, as in fluorescence live imaging.

Ratio imaging involves measuring the ratio between the intensities of two types of fluorescence emitted from a single fluorescence probe molecule by using a probe whose intensity of fluorescence changes in accordance with changes in ion concentration, film potential, and pH, and then observing the activity of a target vital phenomenon from the amount of change in the ratio.

In ratio imaging, the intensities of the two types of fluorescence have to be measured with accuracy. Therefore, when the user uses the input unit 51 to set the ratio mode for performing ratio imaging via the GUI, the linearity priority mode may be automatically selected.

Accordingly, accurate measurement can be performed without the user being conscious of the observation settings.

In a third modification, in a case where the linearity priority mode is selected, if the brightness signal generated by amplifying the output signal within the linear response characteristic range of the detector 47 based on the first amplification factor is saturated, the PC 11 may form an image in which pixels based on the brightness signal are displayed in an overlaid manner such that the pixels are distinguishable from other pixels.

Accordingly, pixels corresponding to saturated brightness signals can be readily ascertained in a high-resolution image in which the desired quantitative characteristics are ensured.

From the above-described embodiments and modifications thereof, the following aspects of the invention are derived.

A first aspect of the present invention provides a detection device including: a detection element that has a linear response characteristic, in which an output signal changes linearly with respect to an input light intensity smaller than or equal to a predetermined value, and a nonlinear response characteristic, in which the output signal changes nonlinearly with respect to an input light intensity larger than the predetermined value, and that detects light from a sample and outputs the output signal in accordance with the intensity of the light; a detection circuit that is capable of switching between a first amplification factor based on which the output signal within a linear response characteristic range falls within a predetermined brightness-signal taking range and a second amplification factor that is lower than the first amplification factor and based on which the output signal including a nonlinear response characteristic range falls within the predetermined brightness-signal taking range, the detection circuit amplifying the output signal output from the detection element so as to generate a brightness signal; and an input unit with which an operator is allowed to switch the amplification factor for the output signal to be used by the detection circuit between the first amplification factor and the second amplification factor.

According to this aspect, if the output signal output from the detection element is within the linear response characteristic range, high-resolution information of the sample is obtained, although the brightness is low. In contrast, if the output signal includes the nonlinear response characteristic range, bright information of the sample is obtained, although the resolution is insufficient. In this case, by amplifying the output signal in the linear response characteristic range based on the first amplification factor so as to generate a brightness signal within the predetermined brightness-signal taking range, observation in which the brightness signal has quantitative characteristics can be performed. In contrast, by amplifying the output signal including the nonlinear response characteristic range based on the second amplification factor, which is lower than the first amplification factor, so as to generate a brightness signal within the predetermined brightness-signal taking range, wide-dynamic-range observation can be performed without causing saturation of the brightness signal to occur.

Therefore, the operator uses the input unit to appropriately change the amplification factor of the detection circuit to the first amplification factor or the second amplification factor in accordance with the response characteristic of the output signal output from the detection element, so that observation in which the properties of the detection element are utilized to the maximum can be performed in accordance with the intended purpose of the observation.

In the above aspect, the detection device may further include an interpolator that performs linear interpolation by multiplying an inverse function of the nonlinear response characteristic by the brightness signal obtained as a result of amplifying the output signal including the nonlinear response characteristic range based on the second amplification factor.

According to this configuration, the quantitative characteristics can be improved with respect to a brightness signal that prioritizes the dynamic range.

A second aspect of the present invention provides a microscope system including: an objective lens that focuses light from a sample; the aforementioned detection device that detects the light focused by the objective lens so as to generate the brightness signal; and an image forming unit that forms an image based on the brightness signal generated by the detection circuit.

According to this aspect, by using the detection device that can utilize the properties of the detection element to the maximum in accordance with the intended purpose of the observation, desired observation can be achieved with respect to the sample to be observed.

In the above aspect, in a case where the brightness signal generated by amplifying the output signal within the linear response characteristic range based on the first amplification factor is saturated, the image forming unit may form the image such that a pixel based on the brightness signal is distinguishable from another pixel.

According to this configuration, pixels corresponding to saturated brightness signals can be readily ascertained in a high-resolution image in which quantitative characteristics are desirably ensured.

REFERENCE SIGNS LIST 1 microscope system
7 detection device
11 PC (image forming unit)
35 objective lens
47 detector (detection element)
49 light detection circuit (detection circuit)
51 input unit
S sample

The invention claimed is:

1. A detection device comprising:
   a detection element that detects input light from a sample and that outputs an output signal in accordance with an intensity of the input light, the detection element having a linear response characteristic, in which the output signal changes linearly with respect to an input light intensity smaller than or equal to a predetermined value, and a nonlinear response characteristic, in which the output signal changes nonlinearly with respect to an input light intensity larger than the predetermined value;
   a detection circuit that is capable of switching between (i) a first amplification factor for a linearity priority mode in which the output signal within a linear response characteristic range falls within an input range of an AD converter of the detection circuit, and (ii) a second amplification factor for a dynamic-range priority mode in which the output signal including a nonlinear response characteristic range falls within the input range of the AD converter, the second amplification factor being lower than the first amplification factor, and the detection circuit amplifying the output signal output from the detection element so as to generate a brightness signal; and
   an input unit operable by an operator to selectively switch the amplification factor for the output signal to be used by the detection circuit between the first amplification factor for the linearity priority mode and the second amplification factor for the dynamic-range priority mode.

2. The detection device according to claim 1, further comprising:
   an interpolator that performs linear interpolation by multiplying an inverse function of the nonlinear response characteristic by the brightness signal obtained as a result of amplifying the output signal including the nonlinear response characteristic range based on the second amplification factor for the dynamic-range priority mode.

3. A microscope system comprising:
   an objective lens that focuses light from a sample;
   the detection device according to claim 1 or 2 that detects the light focused by the objective lens so as to generate the brightness signal; and
   an image forming unit that forms an image based on the brightness signal generated by the detection circuit.

4. The microscope system according to claim 3, wherein in a case where the brightness signal generated by amplifying the output signal within the linear response characteristic range based on the first amplification factor for the linearity priority mode is saturated, the image forming unit forms the image as an image in which a pixel based on the brightness signal is displayed in an overlaid manner such that the pixel is distinguishable from another pixel.

* * * * *